United States Patent

Mullins et al.

[11] Patent Number: 5,912,459
[45] Date of Patent: Jun. 15, 1999

[54] METHOD AND APPARATUS FOR FLUORESCENCE LOGGING

[75] Inventors: Oliver C. Mullins, Ridgefield; Xu Wu, Danbury; Philip Rabbito, Milford, all of Conn.

[73] Assignee: Schlumberger Technology Corporation, New York, N.Y.

[21] Appl. No.: 08/873,849

[22] Filed: Jun. 12, 1997

Related U.S. Application Data

[63] Continuation of application No. 08/445,121, May 19, 1995, which is a continuation of application No. 08/249,430, May 26, 1994, abandoned.

[51] Int. Cl.$^6$ .................................................. G01V 8/02
[52] U.S. Cl. .................... 250/256; 250/254; 250/268; 250/269.1
[58] Field of Search .................. 250/256, 254, 250/268, 269.1

[56] References Cited

U.S. PATENT DOCUMENTS

| | | | |
|---|---|---|---|
| 2,346,481 | 4/1944 | Garrison | 250/267 |
| 4,696,903 | 9/1987 | Owen | 436/28 |

FOREIGN PATENT DOCUMENTS

791956  12/1980  U.S.S.R. ................................ 250/256

*Primary Examiner*—Constantine Hannaher
*Attorney, Agent, or Firm*—David Garrod

[57] ABSTRACT

A method of locating in situ hydrocarbons in underground formations comprises illuminating the borehole wall with light such as visible, infrared or ultraviolet light or combinations of these, from a source in a tool such as a wireline logging tool or an LWD tool, detecting any fluorescent radiation with a detector in the tool and analyzing the florescent radiation to determine the presence of hydrocarbon in the formation. The tool is moved through the borehole while irradiating the formation and detecting fluorescence. The borehole wall is illuminated and fluorescence detected through a window in the tool which is pressed against the borehole wall with sufficient force to displace any mudcake. The window is made of a wear resistant material such as sapphire or diamond and is conveniently secured in a wear resistant housing which might be made of tungsten carbide or the like.

35 Claims, 4 Drawing Sheets

METHOD AND APPARATUS FOR FLUORESCENCE LOGGING

CROSS-REFERENCE TO RELATED APPLICATIONS

This application is a continuation of U.S. patent application Ser. No. 08/445,121, filed May 19, 1995, pending which is a continuation of U.S. patent application Ser. No. 08/249,430, filed May 26, 1994 abandoned.

FIELD OF THE INVENTION

The present invention relates to a method and apparatus for fluorescence logging of underground formations surrounding a borehole. In particular, the invention relates to the detection of hydrocarbons in pore fluid from the formations.

BACKGROUND OF THE INVENTION

It is well known that many organic compounds such as aromatic hydrocarbons fluoresce when irradiated with electromagnetic radiation of certain wavelengths. The property of fluorescence, particularly in response to ultra-violet radiation, had been used for many years as the basis of a method of chemical analysis. Fluorescence analysis has also been performed on cuttings or cores obtained during the drilling of wells to determine the presence of hydrocarbons in pore fluid. An example of such a technique can be found in U.S. Pat. No. 4,690,821. In techniques such as these, the cuttings or cores are cleaned to remove any drilling fluid products which might otherwise interfere with the analysis and the samples are crushed and extracted with a solvent which is then analyzed. Alternatively the sample is irradiated directly and the fluorescence analyzed. While this technique can provide reasonably accurate analysis of the pore fluids, there are certain drawbacks. Cores are relatively expensive to obtain and must be returned to the surface for analysis. Also, since cores are only taken at specific locations, it is possible that a hydrocarbon-bearing formation can be missed. Cuttings are obtained continuously in drilling, but have the disadvantage that it is not possible to determine at the surface exactly where the cuttings originate downhole making the identification of hydrocarbon-bearing formations difficult. Also the cuttings give no accurate indication of the extent of any hydrocarbon bearing formations.

It has been proposed to use fluorescence of hydrocarbons for downhole evaluation of pore fluids with a wireline logging tool. U.S. Pat. No. 2,206,922 discloses a wireline tool which is lowered into a well and which uses fluorescence in response to ultra-violet radiation to detect hydrocarbons. In one application, it is proposed to use this tool to detect the presence of oil in a drilling fluid in the well as an indication of oil-bearing strata. In another application it is proposed to bail drilling fluid from the well and to examine the borehole wall for oil. Neither application is feasible. In the first case, the presence of any fluorescence materials, such as oil, which are added to the drilling fluid-in use will mask fluorescence from oil entering the borehole from the formation. In any event, only small amounts of oil will enter a borehole due to the mud overpressure. Also, oil entering the borehole from the formation will become dispersed during drilling or will migrate up the well due to its differing density to the drilling fluid. Therefore this approach will not allow accurate identification of oil bearing strata. In the second case, the option of taking drilling fluid from the well is not usually available in well drilling and in any case this will not remove mud cake from the borehole wall which will mask the underlying formations. U.S. Pat. No. 2,206,922 fails to disclose any method or apparatus which might conceivably work in the desired manner in an oil well drilled using current technology. In particular, there is no disclosure of a technique which could be used to reliably log the length of the well with any expectation of being able to identify hydrocarbon-bearing formations.

U.S. Pat. No. 2,346,481 proposes a fluorescence logging tool which can be lowered into a well and logged to identify oil-bearing strata. In this case, the tool includes an ultra-violet light source and a transparent bar of quartz projects from the light source and is maintained in contact with the borehole wall. A further quartz bar is provided to direct the fluorescence to a film recorder as the tool is logged through the borehole. While it appears to address some of the problems associated with the approach in U.S. Pat. No. 2,206,922, the system described would still fail to function as described or intended. In order to examine the borehole wall, it would be necessary for the quartz rods to penetrate the mudcake formed thereon. However, the force which must be applied to the quartz bar to ensure that this would take place would be too high and the bars would fail mechanically. Also the action of logging the tool through the borehole would ignore forces on the quartz bars which would cause them to fail even if the mudcake were not significant. Therefore the approach set forth in U.S. Pat. No. 2,346,481 is also inoperable.

U.S. Pat. No. 2,334,475 also discloses a fluorescence logging tool for detecting petroleum in situ. The tool includes an ultraviolet source which illuminates the rock through a quartz window and detects fluorescence through the same window. The window is suggested as being glass or quartz and, in one case, is housed in a mounting which includes portions for cutting through the mudcake on the borehole wall. It is suggested that quartz be selected as a material which is sufficiently resistant to withstand the friction of the borehole wall during the logging application and that the window project from its housing to come into direct contact with the borehole wall. However quartz is not sufficiently strong to withstand the forces generated during logging and will fail by fracturing. Thus the embodiment described in U.S. Pat. No. 2,334,475 also is inoperable and in all likelihood would not withstand more than a few feet of logging before tool failure.

It is an object of the present invention to provide a method and apparatus for identifying in situ hydrocarbons using fluorescence.

SUMMARY OF THE INVENTION

The present invention provides a method of locating in situ hydrocarbons in underground formations comprising placing a tool in a borehole, illuminating the borehole wall with light from a source in the tool, detecting any fluorescent radiation with a detector in the tool and analyzing the fluorescent radiation to determine the presence of hydrocarbon in the formation.

The method can also comprise moving the tool through the borehole while irradiating the formation and detecting fluorescence. Preferably, the borehole wall is illuminated and fluorescence detected through a window in the tool which is pressed against the borehole wall. The window is typically pressed against the borehole wall with sufficient force to displace any mudcake for a substantial time as the tool is moved through the borehole. This force is preferably such that the pressure applied at the window when in contact with the borehole wall is substantially greater than the overpressure of the fluid in the borehole. It is also preferred that the tool should be pressed against the borehole with sufficient force to cut into the surface of the rock, typically to a depth of the order of fractions of a millimeter in the porous rocks of interest, so as to reduce the effect of rugosity on the contact between the window and the rock.

The light source can be visible, infrared or ultraviolet light or combinations of these. It is preferred that the source is a visible/near UV or visible/near IR source. In certain circumstances, it may be desirable to avoid using an UV source.

The present invention also provides an apparatus for locating in situ hydrocarbons in underground formations carrying a tool body, a source of light in the body arranged to illuminate the borehole wall and a detector arranged to detect fluorescence radiation from the borehole wall.

In one embodiment, the tool body includes a window thorough which the borehole wall is illuminated and the fluorescent radiation is detected. The window is preferably made of a wear resistant material such sapphire or diamond and is conveniently secured in a wear resistant housing which might be made of tungsten carbide, polycrystalline diamond compact, or the like. The outer surface of the window is substantially flush with the outer surface of the housing. The illuminating light preferably passes from the source to the window, and the fluorescent radiation passes from the window to the detector, by means of optical fibers although other means might also be appropriate.

The apparatus can also include means by which the window can be pressed against the borehole wall. Such means can comprise members which bear against the borehole wall and urge the tool body against the portion of the borehole wall to be investigated. Alternatively, the windows can be mounted on a pad or caliper which is urged against the borehole wall. The pad can be mounted on an arm which is attached to the tool body.

The optical head can be shaped to allow the displacement of the mudcake and cutting into the rock surface or a cutter can precede the optical head for this purpose.

The light source can be a lamp such as a tungsten halogen lamp, an LED or a laser diode.

One particularly preferred embodiment comprises a logging-while-drilling apparatus. In this case, the window can be mounted in a stabilizer blade or in the wall of a bottom hole assembly drill collar or at or near the bit.

BRIEF DESCRIPTION OF THE DRAWINGS

The present invention will now be described by way of example with reference to the accompanying drawings, in which.

DETAILED DESCRIPTION OF THE PREFERRED EMBODIMENT

Figure 1:
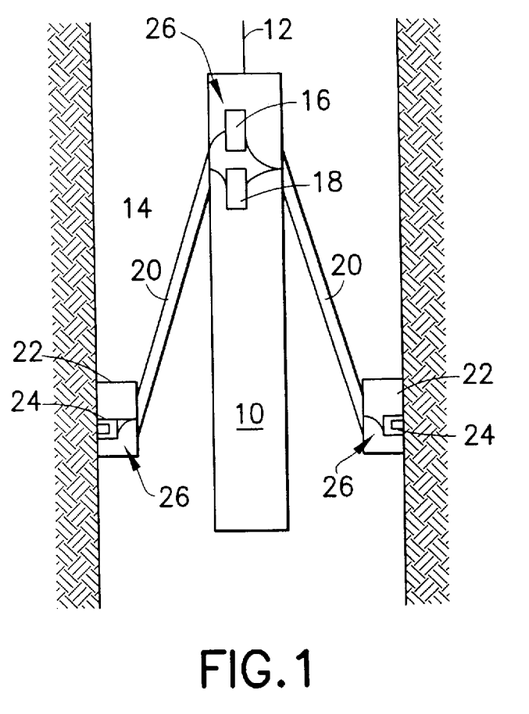
FIG. 1 shows a schematic view of a wireline logging tool according to one embodiment of the invention.

Referring now to the drawings, FIG. 1 shows a schematic view of a wireline logging tool according to one embodiment of the present invention. The tool comprises a tool body 10 which is suspended from a wireline cable 12 by which it can be lowered into a borehole 14. The tool body includes a light source 16 and a detector 18. A series of arms 20 (only two shown) are pivotally connected to the tool body 10 and are urged outwardly from the tool body 10 by means of springs or hydraulic pressure such that the end of each arm 20 contacts the borehole wall. Each arm 20 carries at its outer end a pad 22 which includes an optical head 24 which contacts the borehole wall and is connected via an optical system 26 to the light source 16 and the detector 18. In an alternative embodiment, the source 16 and detector 18 are also located in the pad 22. In use, the tool is typically lowered into the borehole 14 by means of the wireline cable 12 with the arms 20 folded against the tool body 10. At some point in the borehole, the arms are deployed so as to urge the optical heads 24 against the wall of the borehole 14 and the tool is pulled back to the surface so as to scan the heads 24 over the wall. The wall is illuminated by light from the source 16 and fluorescence is detected at the detector 18 and communicated to the surface via the wireline cable 12. Because the position of the tool in the well can be determined from the length of cable withdrawn when returning the tool to the surface, the depths of the formations being scanned can be determined with a high degree of accuracy.

Figure 2:
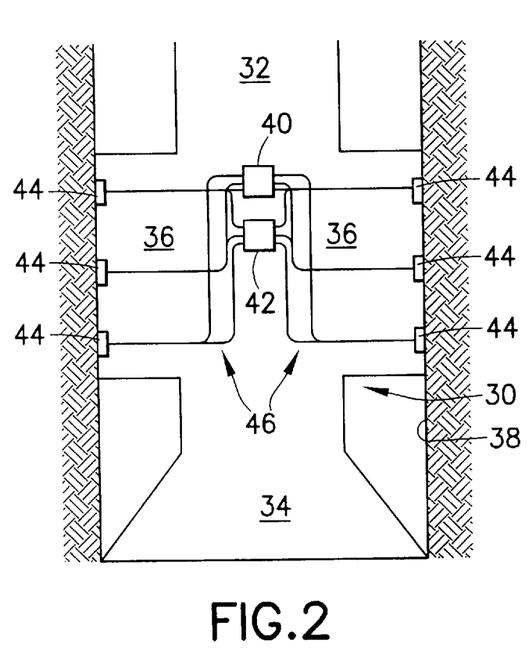
FIGS. 2 and 3 show schematic views of logging-while-drilling tools according to further embodiments of the invention.
Figure 3:
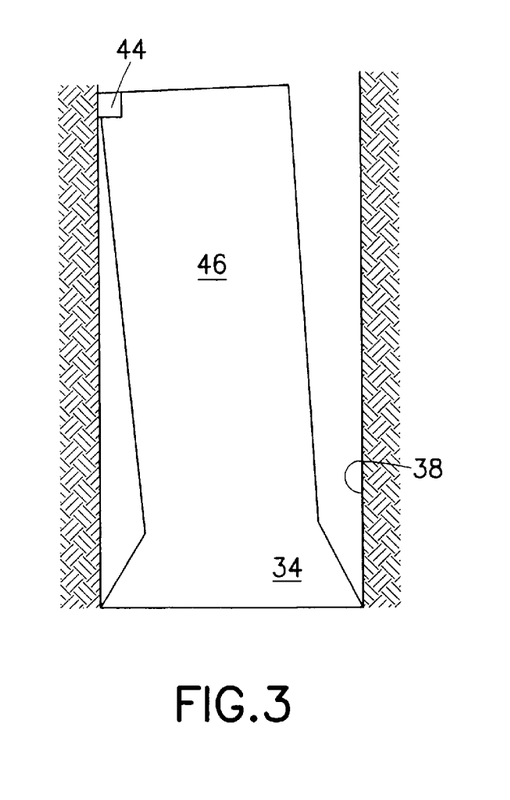

Alternative embodiments of the present invention comprising logging-while-drilling (LWD) tools are shown in FIGS. 2 and 3. In these cases, the tools form part of the bottom hole assembly (BHA's) which constitutes the lower end of a drill string used to drill a borehole. In FIG. 2, the tool body comprises a stabilizer 30 which is positioned in the BHA 32 close to the drill bit 34. The stabilizer includes blades 36 (two shown) which contact the wall of the borehole 38 in order to influence the behavior of the bit 34 during drilling. A light source 40 and detector 42 are located in the BHA 32 and are connected to one or more optical heads 44 located in the stabilizer blades 36 by means of a fiber optic system 46. In the embodiment shown in FIG. 3 the stabilizer is absent and the optical heads 44 are located in the wall of a drill collar 46 forming part of the BHA. It will be appreciated that during drilling, the drill collar 46 will contact the wall of the borehole 38 from time to time and the optical head 44 will be held against the wall by the drill collar 46. In use, the drill string is rotated during drilling such that the optical heads also rotate therewith. Thus the heads will scan the borehole wall circumferentially, at least for the period when the drill collar or stabilizer blade is in contact with the wall, and axially as the drilling progresses and the borehole becomes deeper. Further embodiments have the optical head mounted at the bit or immediately behind the bit. In all of these cases, the fluorescence detected is communicated to the surface in the manner typical to LWD measurements which is well known.

Figure 4:
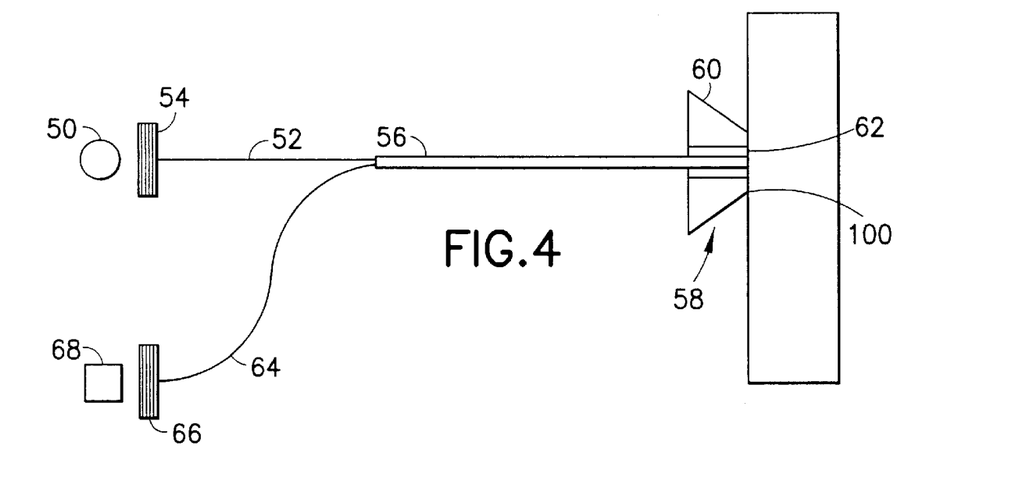
FIG. 4 shows a general optical arrangement for the tools shown in FIGS. 1–3.

The general optical arrangement applicable to the embodiments shown in FIGS. 1–3 is shown in FIG. 4. One or more light sources 50 can comprise one or more of the following: tungsten halogen lamp, e.g. $WI_2$ having a typical power of 10 W and producing light in the UV-visible-near IR with filtering being used to select the desired range, a blue LED having a focused power output of 3 mW and producing light of about 450 nm wavelength, or a laser diode having a power of about 30 mW and producing light of about 674 nm wavelength. A tungsten halogen source will be described here and it will be appreciated that certain aspects of the optical system will be different if another source is used. In any event, the light source will include some means of chopping the light. This may be electrical or mechanical depending upon the source. Light from the WI$_2$ bulb(s) 50 passes into an optical fiber 52 via a high performance shortpass filter 54 with a passband of 400–500 nm. The optical fiber 52 forms part of a bifurcated fiber bundle 56 which is connected to an optical head 58. The optical head is shown in more detail in FIGS. 5, 6 and 7 and comprises a wear resistant housing 60 with a window 62 which is optically connected to the fiber bundle 56. The optical fibers typically comprise high OH$^-$ fibers which have low fluorescence. The optical head is pressed against the borehole wall with sufficient force (500–2000 psi) to penetrate any mudcake present thereon and to cut into the surface of the rock to reduce the effect of rugosity of the surface and to place the window 62 in contact with the formation as the tool is moved through the borehole. It will be appreciated that it is only important to maintain contact between the window and the rock in porous formations likely to contain oil and so the design of optical head used and the force applied are selected to cut into such rocks as shales and sandstones. It is preferred that the head cuts into the surface of a typical porous rock to depths of no more than 1 mm. An alternative approach is to precede the window with a separate plough or cutting tooth and place the window in contact with the rock immediately behind this. Also, a silicone fluid 100 may be injected to improve optical contact with the formation. Scattered or fluorescent light from the formation returns through the window 62 and passes along a further optical fiber 64 forming part of the bundle 56 to a longpass filter 66 having a passband, for example, of 550–750 nm and on to a silicon photodiode detector 68. Other suitable detectors comprise GaAsP detectors, photomultipliers, microchannel plates and GaP detectors. The filter 66 serves to remove any scattered light so that only fluorescent light passes to the detector 68. The detector 68 is connected to suitable circuitry (not shown) such that information can be passed to the surface in an appropriate manner. In a further embodiment, multiple sources are provided for light of differing wavelengths. Also multichannel detectors can be provided for spectroscopic measurements.

Figure 5:
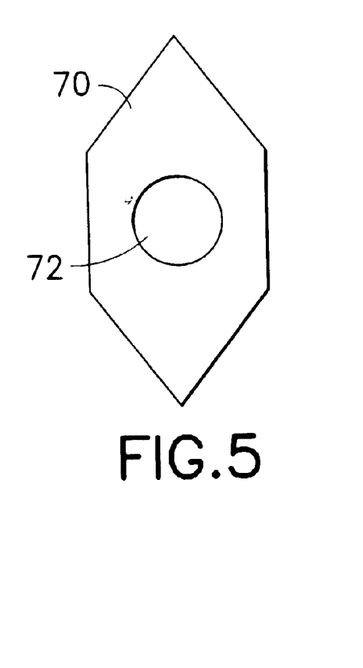
FIGS. 5, 6 and 7 show various aspects of an optical head for use in the present invention.
Figure 6:
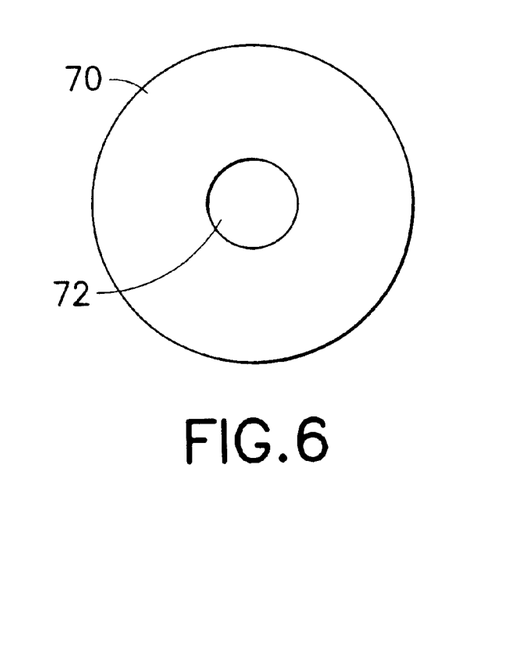
Figure 7:
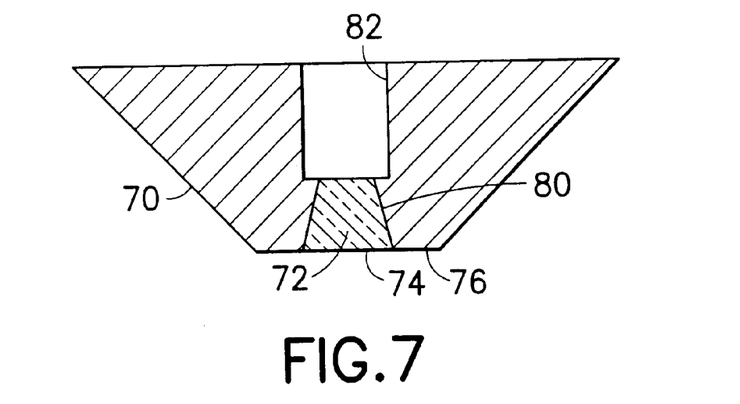

One form of optical head which is particularly suitable for use in a wireline logging tool is shown in FIG. 5. The head comprises a wear resistant housing 70 made of a material such as tungsten carbide (10% cobalt) or polycrystalline diamond compact which is shaped so as to act as a plough and remove mudcake from the borehole wall as the tool is logged up the borehole. A window 72 made of a wear resistant transmissive material such as sapphire, diamond, polycrystalline diamond or diamond-like material is located in the center of the housing 70. As shown in FIG. 7, the window 72 is brazed or glued in place and is arranged so that the outer surface 74 is flush with the outer surface 76 of the housing 70. It is important that the window does not protrude from the housing since the shear forces encountered in logging are sufficient to fracture the window 72 such that its optical performance will be degraded to such an extent that it would not be possible to utilize the results of the logging operation. It is also important that the window is not recessed from the surface of the housing in order that material cannot build up in the recess and prevent the light from reaching the borehole wall or masking any fluorescence. However, when the optical head is mounted at the bit or just behind the bit in an LWD arrangement, or in the channel of a plough in a wireline tool, it may be possible to recess the head slightly to provide some mechanical protection for the window without degrading the performance of the unit excessively. This is because there is sufficient flow of mud and cuttings near the bit or plough to prevent any build-up over the window and a sufficient quantity of material is passed in front of the window to make it unnecessary to hold the window in contact with the formation to detect oil. An alternative form of optical head is shown in FIGS. 6 and 7 which is particularly suitable for LWD applications. In LWD it is necessary that the head be able to scan the borehole wall circumferentially as the drill string rotates and axially as the drilling progresses. Consequently, the plough shape described in relation to FIG. 5 is not appropriate and a circular shape as shown in FIG. 6 is used. The materials are the same as before as is the requirement that the window be flush with the surface of the housing. In a case such as shown in FIG. 2, where the optical head is mounted in a stabilizer blade, the window and head should be flush with the outer surface of the blade. When the optical head is mounted in a drill collar, such as shown in FIG. 3, the head might protrude from the surface by a small amount (e.g. 1 mm) without unduly affecting the durability of the arrangement. FIG. 7 shows a cross section of the head shown in FIG. 6, the head of FIG. 5 also having a similar cross section. The window 72 comprises a frusto-conical sapphire insert which is located in a correspondingly shaped recess 80 in the tungsten carbide housing 70 by means of gluing, for example using Emerson & Cuming Inc. Uniset G-757, or brazing. The recess 80 is shaped such that the narrow end is innermost. This is to reduce the likelihood that the window 72 could be pushed back into the housing 70 due to borehole pressure and the pressure applied to the head to keep the window in contact with the formation and so leave a recess at the surface in which material could build up and mask the borehole fluorescence. The window should preferably withstand a pressure of 20,000 psi at 400° F. for several hours. The inner end of the recess connects to a bore 82 into which the fiber optic bundle projects. The fibers of the bundle are optically coupled to the window in the usual manner. A further form of window replaces the sapphire or diamond described above with a silicone fluid which is continuously injected through the housing "window" into optical contact with the formation. In this case the housing is pressed against the formation and the window is continuously replaced as the rock surface is scanned.

Figure 8:
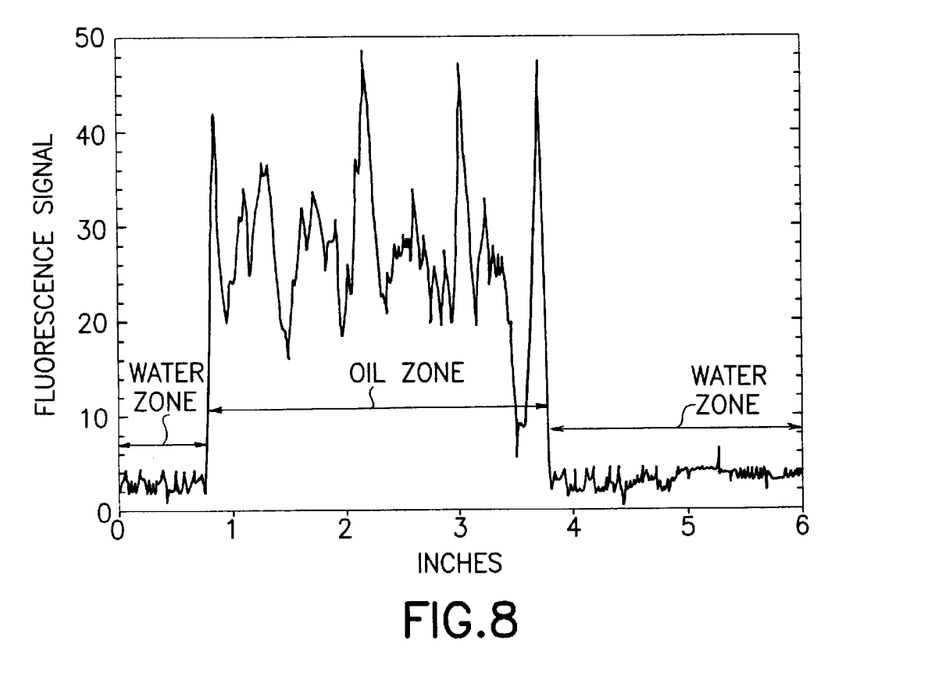
FIG. 8 shows a plot of fluorescence intensity as an optical head is logged over a sample of rugose rock.

FIG. 8 shows a plot of fluorescence intensity against position of a test head on a sample of rugose rock (sandstone). In order to obtain this plot, a sample of rock is placed in a pressure cell and a mudcake is grown thereon and an overpressure of 1000 psi is applied. An optical head which is substantially as described above and is connected to an optical arrangement similar to that described previously is pressed onto the sample with a net force of about 200 lb which corresponds to a pressure of 2000 psi. The rock sample is then rotated so that the head follows a circular path over the surface of the sample, at least part of which is saturated with oil, the remainder being water saturated. As will be seen from FIG. 8, there is a significant intensity of fluorescent light when the head traverses the oil saturated zone which is not seen in the water saturated zone (the low, non-zero reading in the water zone is due to incomplete rejection of scattered light by the optical system, and by small fluorescence signals produced by optical components as well as by the sandstone). The magnitude of the measured fluorescence for this sample is dependent upon the force applied to keep the head on the sample and the mud overpressure, the higher the overpressure the higher the force needed to be applied to the head to obtain consistent results. Because of the rugosity of the sample, it is not possible to keep the head in contact with the sample at all times. However, this does not prevent the detection of oil by fluorescence provided that, when the head is in contact, the pressure is sufficient to penetrate the mudcake and see only the rock below. In the LWD situation, it will be clear that the head will spend a considerable time off the rock surface. However, when the head is in contact, the pressure applied is very high and the head will also have the opportunity to scan a portion of the borehole several times since the rate of penetration is not exceptionally fast even at optimum drilling rates.

We claim:

1. A method of locating in situ hydrocarbons in underground formations surrounding a borehole, comprising:
   (a) placing a tool in a borehole:
   (b) illuminating a wall of the borehole with light from a source in the tool;
   (c) detecting any fluorescence from the wall with a detector in the tool;
   (d) analyzing the detected fluorescence to determine the presence of hydrocarbon in the formation; and
   (e) moving the tool through the borehole while illuminating the borehole wall and detecting fluorescence;
   wherein mudcake is removed from the borehole wall prior to illumination.

2. A method of locating in situ hydrocarbons in underground formations surrounding a borehole, comprising:
   (a) placing a tool in a borehole;
   (b) illuminating a wall of the borehole with light from a source in the tool;
   (c) detecting any fluorescence from the wall with a detector in the tool; and,
   (d) analyzing the detected fluorescence to determine the presence of hydrocarbon in the formation;
   wherein the borehole wall is illuminated, and fluorescence detected, through a window in the tool which is pressed against the borehole wall;
   wherein a part of the tool including the window is pressed against the borehole with sufficient force to displace any mudcake; and,
   wherein the force is such that the pressure applied at the window when in contact with the borehole wall is substantially greater than the overpressure of the fluid in the borehole.

3. A method of locating in situ hydrocarbons in underground formations surrounding a borehole during drilling with a bottom hole assembly including a drill bit comprising:
   a) illuminating a wall of the borehole with light from a source in the drill bit,
   c) detecting any fluorescence from the wall with a detector in the bottom hole assembly, and
   d) analyzing the detected fluorescence to determine the presence of hydrocarbon in the formation.

4. A method of locating in situ hydrocarbons in underground formations surrounding a borehole during drilling with a bottom hole assembly including a drill bit comprising:
   a) illuminating a wall of the borehole with light from a source in the bottom hole assembly near the drill bit,
   c) detecting any fluorescence from the wall with a detector in the bottom hole assembly near the drill bit, and
   d) analyzing the detected fluorescence to determine the presence of hydrocarbon in the formation.

5. Apparatus for locating in situ hydrocarbons in underground formations surrounding a borehole, comprising:
   (a) a tool body;
   (b) a source of light in the body arranged to illuminate a wall of the borehole; and,
   (c) a detector arranged to detect fluorescent radiation from the borehole wall;
   wherein the tool body includes a window through which the borehole wall is illuminated and the fluorescent radiation is detected; and,
   wherein the window is made of a wear resistant material.

6. Apparatus for locating in situ hydrocarbons in underground formations surrounding a borehole, comprising:
   (a) a tool body;
   (b) a source of light in the body arranged to illuminate a wall of the borehole; and,
   (c) a detector arranged to detect fluorescent radiation from the borehole wall;
   wherein the tool body includes a window through which the borehole wall is illuminated and the fluorescent radiation is detected; and,
   wherein the window is secured in a housing made of a wear resistant material.

7. Apparatus for locating in situ hydrocarbons in underground formations surrounding a borehole, comprising:
   (a) a tool body;
   (b) a source of light in the body arranged to illuminate a wall of the borehole; and,
   (c) a detector arranged to detect fluorescent radiation from the borehole wall;
   wherein the tool body includes a window through which the borehole wall is illuminated and the fluorescent radiation is detected; and,
   further comprising means by which the window can be pressed against the borehole wall; and,
   cutting means capable of forming a cut in the borehole wall into which the window is pressed.

8. Apparatus as claimed in claim 7, wherein the window is mounted on a member which, in use, is pressed against the borehole wall.

9. Apparatus for locating in situ hydrocarbons in underground formations surrounding a borehole, comprising:
   (a) a tool body;
   (b) a source of light in the body arranged to illuminate a wall of the borehole; and,
   (c) a detector arranged to detect fluorescent radiation from the borehole wall;
   wherein the tool body includes a window through which the borehole wall is illuminated and the fluorescent radiation is detected; and,
   wherein the window comprises a silicone fluid which is continuously injected into optical contact with the formation from the tool body.

10. Apparatus for locating in situ hydrocarbons in underground formations surrounding a borehole, comprising:
    (a) a tool body;
    (b) a source of light in the body arranged to illuminate a wall of the borehole; and,
    (c) a detector arranged to detect fluorescent radiation from the borehole wall;
    wherein the illuminating light passes from the source to the window, and the fluorescent radiation passes from the window to the detector, by means of optical fibers.

11. Apparatus for locating in situ hydrocarbons in underground formations surrounding a borehole, comprising:

(a) a tool body;

(b) a source of light in the body arranged to illuminate a wall of the borehole; and, (c) a detector arranged to detect fluorescent radiation from the borehole wall;

wherein the light source comprises a visible/near IR source.

12. Apparatus for locating in situ hydrocarbons in underground formations surrounding a borehole, comprising:

(a) a tool body;

(b) a source of light in the body arranged to illuminate a wall of the borehole; and, (c) a detector arranged to detect fluorescent radiation from the borehole wall;

wherein the detector is selected from silicon detectors, GaAsP detectors, photomultipliers, microchannel plates and GaP detectors.

13. Logging-while-drilling apparatus for locating in situ hydrocarbons in underground formations surrounding a borehole, comprising:

(a) a tool body;

(b) a source of light in the body arranged to illuminate a wall of the borehole; and, (c) a detector arranged to detect fluorescent radiation from the borehole wall.

14. A method of locating in situ hydrocarbons in underground formations surrounding a borehole, comprising:

a) placing a tool in a borehole;

b) illuminating a wall of the borehole through a window in the tool which is pressed against the borehole wall with sufficient force to displace any mudcake for a substantial time as the tool is moved through the borehole;

c) detecting any fluorescence from the wall through said window using a detector in the tool; and d) analyzing the detected fluorescence to determine the presence in hydrocarbon in the formation.

15. A method as claimed in claim 14, wherein a part of the tool is pressed against the borehole wall with sufficient force to create a cut in the borehole wall as the tool is moved through the borehole and the window is pressed against the cut.

16. Logging-while-drilling apparatus for locating in situ hydrocarbons in underground formations surrounding a borehole, comprising:

a) a bottom hole assembly, including a stabilizer blade;

b) a source of light, mounted behind a window in said stabilizer blade, and arranged to illuminate a wall of the borehole; and c) a detector arranged to detect fluorescent radiation from the borehole wall.

17. Logging-while-drilling apparatus for locating in situ hydrocarbons in underground formations surrounding a borehole, comprising:

a) a bottom hole assembly, including a drill collar;

b) a source of light, arranged to illuminate a wall of the borehole through a window mounted in a wall of said drill collar; and c) a detector arranged to detect fluorescent radiation from the borehole wall.

18. A method of locating in situ hydrocarbons in underground formations surrounding a borehole, comprising:

a) placing a tool in a borehole;

b) illuminating a wall of the borehole with a light from a source in the tool through a window in the tool which is pressed against the borehole wall with sufficient force to displace any mudcake, wherein said force is such that the pressure applied at the window when in contact with the borehole wall is substantially greater than the overpressure of the fluid in the borehole;

c) detecting through said window any fluorescence from the wall with a detector in the tool;

d) analyzing the detected fluorescence to determine the presence of hydrocarbon in the formation.

19. A method of locating in situ hydrocarbons in underground formations surrounding a borehole, comprising:

a) placing a tool in a borehole;

b) illuminating a wall of the borehole with light from a source in the tool;

c) detecting any fluorescence from the wall with a detector in the tool;

d) analyzing the detected fluorescence to determine the presence of hydrocarbon in the formation; and e) wherein the tool is moved through the borehole while illuminating the borehole wall and detecting fluorescence in a manner so as to remove mudcake from the borehole wall prior to illumination.

20. Apparatus for locating in situ hydrocarbons in underground formations surrounding a borehole, comprising:

a) a tool body, including a window made from a wear-resistant material;

b) a source of light in the body arranged to illuminate a wall of the borehole through said window; and c) a detector arranged to detect fluorescent radiation from the borehole wall through said window.

21. Apparatus as claimed in claim 20, wherein the wear-resistant material is selected from sapphire, diamond, and polycrystalline diamond.

22. Apparatus for locating in situ hydrocarbons in underground formations surrounding a borehole, comprising:

a) a tool body, including a window secured in a housing made of a wear-resistant material;

b) a source of light in the body arranged to illuminate a wall of the borehole through said window; and c) a detector arranged to detect fluorescent radiation from the borehole wall through said window.

23. Apparatus as claimed in 22, wherein the wear-resistant material is selected from tungsten carbide and polycrystalline diamond compact.

24. Apparatus as claimed in 22, wherein the window has an outer surface which is substantially flush with a corresponding outer surface of the housing.

25. Apparatus for locating in situ hydrocarbons in underground formations, surrounding a borehole, comprising:

a) a tool body, including a window;

b) a source of light in the body arranged to illuminate a wall of the borehole through said window, wherein light passes from the source to the window by means of one or more optical fibers; and c) a detector arranged to detect fluorescent radiation from the borehole wall through said window, wherein said radiation passes from the window to the detector by means of one or more optical fibers.

26. Apparatus as claimed in claim 25, wherein the optical fibers comprise high OH fibers.

27. Apparatus for locating in situ hydrocarbons in underground formations surrounding a borehole, comprising:

a) a tool body, including a window;

b) a source of light in the tool body arranged to illuminate a wall of the borehole through said window;

c) a detector arranged to detect fluorescence radiation from the borehole wall through said window;

d) means by which the window can be pressed against the borehole wall; and e) means capable of forming a cut in the borehole wall into which the window is pressed.

28. Apparatus as claimed in 27, wherein the cutting means comprises a cutter which is mounted on the tool separately from the window and which, in use, precedes the window.

29. Apparatus for locating in situ hydrocarbons in underground formations surrounding a borehole, comprising:

a) a tool body, including a window;

b) a source of light in the tool body arranged to illuminate a wall of the borehole through said window;

c) a detector arranged to detect fluorescent radiation from the borehole wall through said window; and d) means by which the window can be pressed against the borehole wall comprising one or more members which, in use, bear against the borehole wall and urge the tool against the portion of the borehole wall to be investigated.

30. Apparatus for locating in situ hydrocarbons in underground formations surrounding a borehole, comprising:

a) a tool body;

b) a window;

c) a source of light in the tool body arranged to illuminate a wall of the borehole through said window;

d) a detector arranged to detect fluorescent radiation from the borehole wall through said window; and e) wherein said window is mounted on a member which, in use, is pressed against the borehole wall.

31. Apparatus as claimed in 30, wherein the member is mounted on an arm which is attached to the tool body.

32. Apparatus for locating in situ hydrocarbons in underground formations surrounding a borehole, comprising:

a) a tool body;

b) a source of visible/near IR light, comprising one of a tungsten halogen lamp, an LED, or a laser diode, in the body, arranged to illuminate a wall of the borehole; and c) a detector arranged to detect fluorescent radiation from the borehole wall.

33. Apparatus for locating in situ hydrocarbons in underground formations surrounding a borehole, comprising:

a) a tool body;

b) a source of light in the tool body arranged to illuminate a wall of the borehole; and c) a detector, selected from the group consisting of silicon detectors, GaAsP detectors, photomultipliers, microchannel plates, and GaP detectors, arranged to detect fluorescent radiation from the borehole wall.

34. Logging-while-drilling apparatus for locating in situ hydrocarbons in underground formations surrounding a borehole, comprising:

a) a tool body;

b) a source of light in the body arranged to illuminate a wall of the borehole; and c) a detector arranged to detect fluorescent radiation from the borehole wall.

35. Apparatus for locating in situ hydrocarbons in underground formations surrounding a borehole, comprising:

a) a tool body, having a window associated therewith;

b) a source of light in the body arranged to illuminate a wall of the borehole through the window;

c) a detector arranged to detect fluorescent radiation from the borehole wall through the window; and d) wherein the window comprises a silicone fluid, which is continuously injected into optical contact with the formation from the tool body.

* * * * *